US009540259B2

(12) United States Patent
Lutz et al.

(10) Patent No.: US 9,540,259 B2
(45) Date of Patent: Jan. 10, 2017

(54) APPARATUS FOR PRODUCING AND DELIVERING OZONATED WATER

(75) Inventors: Carl David Lutz, Windham, NH (US); Jeffrey D. Booth, Andover, MA (US); Donald J. Boudreau, Tewksbury, MA (US); Nicholas R. Lauder, Somerville, MA (US); Hossein Zarrin, Winchester, MA (US); William Roster, Salem, NH (US); Richard A. Federico, Reading, MA (US)

(73) Assignee: Electrolytic Ozone, Inc., Wilmington, MA (US)

( * ) Notice: Subject to any disclaimer, the term of this patent is extended or adjusted under 35 U.S.C. 154(b) by 0 days.

(21) Appl. No.: 13/594,578

(22) Filed: Aug. 24, 2012

(65) Prior Publication Data

US 2013/0206604 A1  Aug. 15, 2013

Related U.S. Application Data

(60) Provisional application No. 61/527,402, filed on Aug. 25, 2011.

(51) Int. Cl.
| | |
|---|---|
| C02F 1/467 | (2006.01) |
| C02F 1/78 | (2006.01) |
| C02F 1/00 | (2006.01) |
| C02F 1/461 | (2006.01) |
| C01B 13/11 | (2006.01) |
| C25B 15/02 | (2006.01) |
| C25B 1/13 | (2006.01) |

(52) U.S. Cl.
CPC ............ *C02F 1/4672* (2013.01); *C01B 13/11* (2013.01); *C02F 1/008* (2013.01);
(Continued)

(58) Field of Classification Search
CPC ........ C25B 1/13; C02F 9/005; C02F 2209/23;
C02F 1/78; C02F 2307/02; C02F 2307/04;
C02F 2307/10; C02F 2201/78; C02F
2201/782; C02F 2201/784
(Continued)

(56) References Cited

U.S. PATENT DOCUMENTS

| | | | | |
|---|---|---|---|---|
| 5,051,161 A | * | 9/1991 | Yamaguchi et al. | ............ 210/97 |
| 5,106,495 A | * | 4/1992 | Hughes | ............ C02F 1/78 |
| | | | | 210/139 |

(Continued)

FOREIGN PATENT DOCUMENTS

| | | | | |
|---|---|---|---|---|
| CN | 1899975 A | 1/2007 | | |
| CN | 101187037 A | 5/2008 | | |
| CN | 101498007 A | 8/2009 | | |
| EP | 0 636 581 A1 | 2/1995 | ................ | C02F 1/46 |
| EP | 1 162 176 A1 | 12/2001 | ............. | C02F 1/461 |

(Continued)

OTHER PUBLICATIONS

Authorized Officer: Almalé Murillo, José-Antonio, Invitation to Pay Additional Fees and, Where Applicable, Protest Fee; PCT/US2012/052381, Dec. 6, 2012, 9 pages.

(Continued)

*Primary Examiner* — Keith Hendricks
*Assistant Examiner* — Salil Jain
(74) *Attorney, Agent, or Firm* — Sunstein Kann Murphy & Timbers LLP

(57) ABSTRACT

An apparatus has a tank with an interior for containing water, a nozzle for directing ozonated water out of the spray apparatus, and an electrolytic cell located between the nozzle and the tank. The electrolytic cell is configured to ozonate water as the water flows from the tank to the nozzle. The apparatus also includes a power source for providing electric potential to the electrolytic cell. The tank, nozzle, and electrolytic cell all are part of a single spray bottle or dispenser (e.g., like a soap dispenser).

20 Claims, 9 Drawing Sheets

(52) U.S. Cl.
CPC ............ *C02F 1/46104* (2013.01); *C02F 1/78* (2013.01); *C25B 1/13* (2013.01); *C25B 15/02* (2013.01); *C01B 2201/60* (2013.01); *C02F 2201/782* (2013.01); *C02F 2201/784* (2013.01); *C02F 2303/04* (2013.01); *C02F 2307/02* (2013.01); *C02F 2307/04* (2013.01); *C02F 2307/10* (2013.01)

(58) Field of Classification Search
USPC .......................................... 205/626; 210/760
See application file for complete search history.

(56) References Cited

U.S. PATENT DOCUMENTS

| | | | |
|---|---|---|---|
| 5,314,589 A | 5/1994 | Hawley | 204/128 |
| 5,858,201 A | 1/1999 | Otsuka et al. | 205/701 |
| 5,971,368 A | 10/1999 | Nelson et al. | 261/64.3 |
| 6,007,693 A * | 12/1999 | Silveri | 205/335 |
| 6,110,431 A | 8/2000 | Dunder | 422/186.12 |
| 6,261,464 B1 | 7/2001 | Herrington et al. | 210/758 |
| 6,361,686 B1 | 3/2002 | Conrad | 210/192 |
| 6,391,183 B1 | 5/2002 | Tanioka et al. | 205/626 |
| 6,488,271 B1 | 12/2002 | Nelson et al. | 261/121.1 |
| 6,524,475 B1 | 2/2003 | Herrington et al. | 210/192 |
| 6,527,950 B2 | 3/2003 | Conrad et al. | 201/188 |
| 6,551,490 B2 | 4/2003 | Andrews et al. | 205/626 |
| 6,558,537 B1 | 5/2003 | Herrington et al. | 210/192 |
| 6,648,307 B2 | 11/2003 | Nelson et al. | 261/121.1 |
| 6,652,719 B1 | 11/2003 | Tseng | 204/257 |
| 6,736,966 B2 | 5/2004 | Herrington et al. | 210/192 |
| 6,964,739 B2 | 11/2005 | Boyd et al. | 210/167 |
| 7,005,075 B2 | 2/2006 | Herrington et al. | 210/748 |
| 7,008,523 B2 | 3/2006 | Herrington | 205/701 |
| 7,235,169 B2 | 6/2007 | Nakamura et al. | 205/687 |
| 7,238,278 B2 | 7/2007 | Coffey et al. | 210/94 |
| 7,244,357 B2 | 7/2007 | Herrington et al. | 210/321.66 |
| 7,297,268 B2 | 11/2007 | Herrington et al. | 210/321.66 |
| 7,311,831 B2 | 12/2007 | Bradford et al. | 210/321.85 |
| 7,425,301 B2 | 9/2008 | Gillette et al. | 422/28 |
| 7,604,780 B2 | 10/2009 | Teran et al. | 422/186.07 |
| 7,658,824 B2 | 2/2010 | Bremauer | 204/275.1 |
| 7,708,958 B2 | 5/2010 | Namespetra et al. | 422/300 |
| 7,740,749 B2 | 6/2010 | Herrington et al. | 205/701 |
| 7,767,168 B2 | 8/2010 | Namespetra et al. | 422/186.12 |
| 7,837,766 B2 | 11/2010 | Gillette | 95/138 |
| 7,887,679 B2 | 2/2011 | Kitaori et al. | 204/260 |
| 7,959,872 B2 | 6/2011 | Namespetra et al. | 422/300 |
| 7,964,068 B2 | 6/2011 | Kitaori et al. | 204/260 |
| 8,012,339 B2 | 9/2011 | Field | 205/701 |
| 8,133,400 B2 | 3/2012 | Kee et al. | 210/760 |
| 8,319,654 B2 * | 11/2012 | Field et al. | 340/815.4 |
| 2002/0020675 A1 | 2/2002 | Herrington et al. | 210/748 |
| 2002/0141915 A1* | 10/2002 | Holsclaw | A61L 2/183 422/186.12 |
| 2002/0185423 A1 | 12/2002 | Boyd et al. | 201/167 |
| 2003/0042631 A1 | 3/2003 | Nelson et al. | 261/121.1 |
| 2003/0062267 A1* | 4/2003 | Nakamura et al. | 205/556 |
| 2003/0156978 A1 | 8/2003 | Gillette et al. | 422/31 |
| 2003/0209447 A1* | 11/2003 | Andrews et al. | 205/626 |
| 2004/0011723 A1 | 1/2004 | Bradford et al. | 210/321.74 |
| 2004/0173528 A1 | 9/2004 | Herrington et al. | 201/637 |
| 2004/0178145 A1 | 9/2004 | Herrington et al. | 210/637 |
| 2004/0211676 A1 | 10/2004 | Herrington | 205/701 |
| 2004/0226873 A1 | 11/2004 | Herrington et al. | 210/192 |
| 2005/0005954 A1 | 1/2005 | Barani | 134/94.1 |
| 2005/0017380 A1 | 1/2005 | Namespetra et al. | 261/75 |
| 2005/0252844 A1* | 11/2005 | Chau | C02F 1/002 210/282 |
| 2006/0037869 A1 | 2/2006 | Mitchke | 205/701 |
| 2006/0157343 A1* | 7/2006 | Herrington | A61L 2/035 204/232 |
| 2006/0163174 A1 | 7/2006 | Namespetra et al. | 210/760 |
| 2007/0023273 A1 | 2/2007 | Kitaori et al. | 204/164 |
| 2007/0086913 A1 | 4/2007 | Teran et al. | 422/28 |
| 2007/0207073 A1 | 9/2007 | Drucker | 422/292 |
| 2008/0067078 A1* | 3/2008 | Kitaori et al. | 205/746 |
| 2008/0128353 A1 | 6/2008 | Andelman | 210/632 |
| 2008/0190825 A1* | 8/2008 | Hengsperger | B01D 53/261 210/95 |
| 2008/0210572 A1 | 9/2008 | Field | 205/770 |
| 2008/0237368 A1 | 10/2008 | Hengsperger et al. | 239/172 |
| 2008/0302651 A1* | 12/2008 | Arai et al. | 204/157.15 |
| 2009/0039032 A1 | 2/2009 | Patera et al. | 210/760 |
| 2009/0039033 A1 | 2/2009 | Kee et al. | 210/760 |
| 2009/0071331 A1 | 3/2009 | Gillette | 95/91 |
| 2009/0072052 A1 | 3/2009 | Gillette | 239/399 |
| 2009/0127128 A1* | 5/2009 | Kitaori et al. | 205/464 |
| 2009/0159436 A1 | 6/2009 | Kasuya et al. | 204/275.1 |
| 2009/0212132 A1 | 8/2009 | Simmonds et al. | 239/289 |
| 2009/0314645 A1 | 12/2009 | Kim | 204/672 |
| 2009/0314651 A1* | 12/2009 | Field | A47L 13/26 205/335 |
| 2009/0314654 A1 | 12/2009 | Field | 205/687 |
| 2009/0314655 A1 | 12/2009 | Field | 205/744 |
| 2009/0314657 A1 | 12/2009 | Field | 205/770 |
| 2009/0314658 A1 | 12/2009 | Field | 205/770 |
| 2009/0314659 A1 | 12/2009 | Field | 205/770 |
| 2010/0135869 A1 | 6/2010 | Shiue et al. | 422/186.08 |
| 2010/0176037 A1 | 7/2010 | Namespetra et al. | 210/85 |
| 2010/0320082 A1 | 12/2010 | Kato et al. | 204/266 |
| 2011/0114548 A1 | 5/2011 | Gillette | 210/188 |
| 2011/0180420 A2 | 7/2011 | Field | 205/687 |
| 2011/0256027 A1 | 10/2011 | Chen et al. | 422/105 |
| 2013/0323605 A1* | 12/2013 | Yamamoto | H01M 4/587 429/332 |

FOREIGN PATENT DOCUMENTS

| | | | |
|---|---|---|---|
| EP | 1 754 804 A1 | 2/2007 | ............ C25B 11/12 |
| EP | 1 903 128 A2 | 3/2008 | ............ C25B 11/02 |
| EP | 1 251 893 B1 | 8/2009 | ............ A61L 2/18 |
| EP | 1 351 893 B1 | 8/2009 | ............ A61L 2/18 |
| EP | 1 903 128 B1 | 9/2010 | ............ C25B 11/02 |
| EP | 1 741 676 B1 | 2/2011 | ............ C02F 1/461 |
| EP | 2 100 623 B1 | 3/2011 | ............ A61L 2/18 |
| JP | 06-328071 | 11/1994 | |
| JP | 6-328071 A | 11/1994 | ............ C02F 1/46 |
| JP | 7-31977 A | 2/1995 | ............ C02F 1/46 |
| JP | H07-031977 * | 2/1995 | ............ C02F 1/46 |
| JP | 11-010159 | 1/1999 | ............ B65D 83/76 |
| JP | 2003 62573 A | 3/2003 | ............ C02F 1/46 |
| JP | 2004 60010 A | 2/2004 | ............ C25B 1/13 |
| JP | 2004 130264 A | 4/2004 | ............ C02F 1/46 |
| JP | 2004130264 A | 4/2004 | ............ C02F 1/46 |
| JP | 2004-283662 | 9/2004 | |
| JP | 2005503893 A | 2/2005 | ............ A61L 9/015 |
| JP | 2007-239041 | 9/2007 | |
| JP | 2008-73604 A | 4/2008 | ............ C02F 1/46 |
| JP | 2009 125628 A | 6/2009 | ............ C02F 1/46 |
| WO | WO 00/05561 A1 | 2/2000 | ............ C02F 1/461 |
| WO | WO 00/35813 | 6/2000 | |
| WO | WO 02/102716 A1 | 12/2002 | ............ C02F 1/461 |
| WO | WO 03/028773 A1 | 4/2003 | ............ A61L 9/00 |
| WO | WO 2005/093129 A1 | 10/2005 | ............ C25B 1/04 |
| WO | WO 2007/092597 | 8/2007 | |
| WO | WO 2007/093395 A2 | 8/2007 | ............ C02F 1/46 |
| WO | WO 2007/095072 A1 | 8/2007 | ............ B08B 3/02 |
| WO | WO 2007/095073 A1 | 8/2007 | ............ B08B 3/02 |
| WO | WO 2007/095074 A1 | 8/2007 | ............ B08B 3/02 |
| WO | WO 2007/095094 A1 | 8/2007 | ............ B08B 3/02 |
| WO | WO 2007/117351 A2 | 10/2007 | |
| WO | WO 2009/011841 A1 | 1/2009 | ............ H01M 8/00 |
| WO | WO 2010/055108 A1 | 5/2010 | ............ C02F 1/461 |

OTHER PUBLICATIONS

Authorized Officer: Van Iddekinge, R. Notification of Transmittal of the International Search Report and the Written Opinion of the International Searching Authority, or the Declaration, PCT/US2012/052381, Mar. 8, 2013, 16 pages.

(56) References Cited

OTHER PUBLICATIONS

Attorney: Thomas J. Tuytschaevers, Amendment of Claims Under PCT Article 19; Statement Under Article 19 and Replacement Pages as filed; PCT/US2012/052381; Date Transmitted: May 8, 2013, 11 pages.
Japanese Patent Office (English Translation), Office Action in Japanese patent application No. 2015-527341, dated Nov. 11, 2015, 4 pages.
Japanese Patent Office, Office Action in Japanese patent application No. 2015-527341, dated Nov. 11, 2015, 8 pages.
Chinese Patent Office, Office Action, Application No. 201280048342.X, 7 pages, dated Jan. 12, 2016.
Chinese Patent Office, Office Action, Application No. 201280048342.X, 7 pages, dated Mar. 27, 2015.
Chinese Patent Office, Office Action, Application No. 201280048342.X, 7 pages, dated Mar. 27, 2015 (English translation).
The International Bureau of WIPO, International Preliminary Report on Patentability, Application No. PCT/US2012/052381, 8 pages, dated Feb. 25, 2014.
European Patent Office EPO Communication, Application No. 12775337.4, 2 pages, dated Jan. 23, 2015.

\* cited by examiner

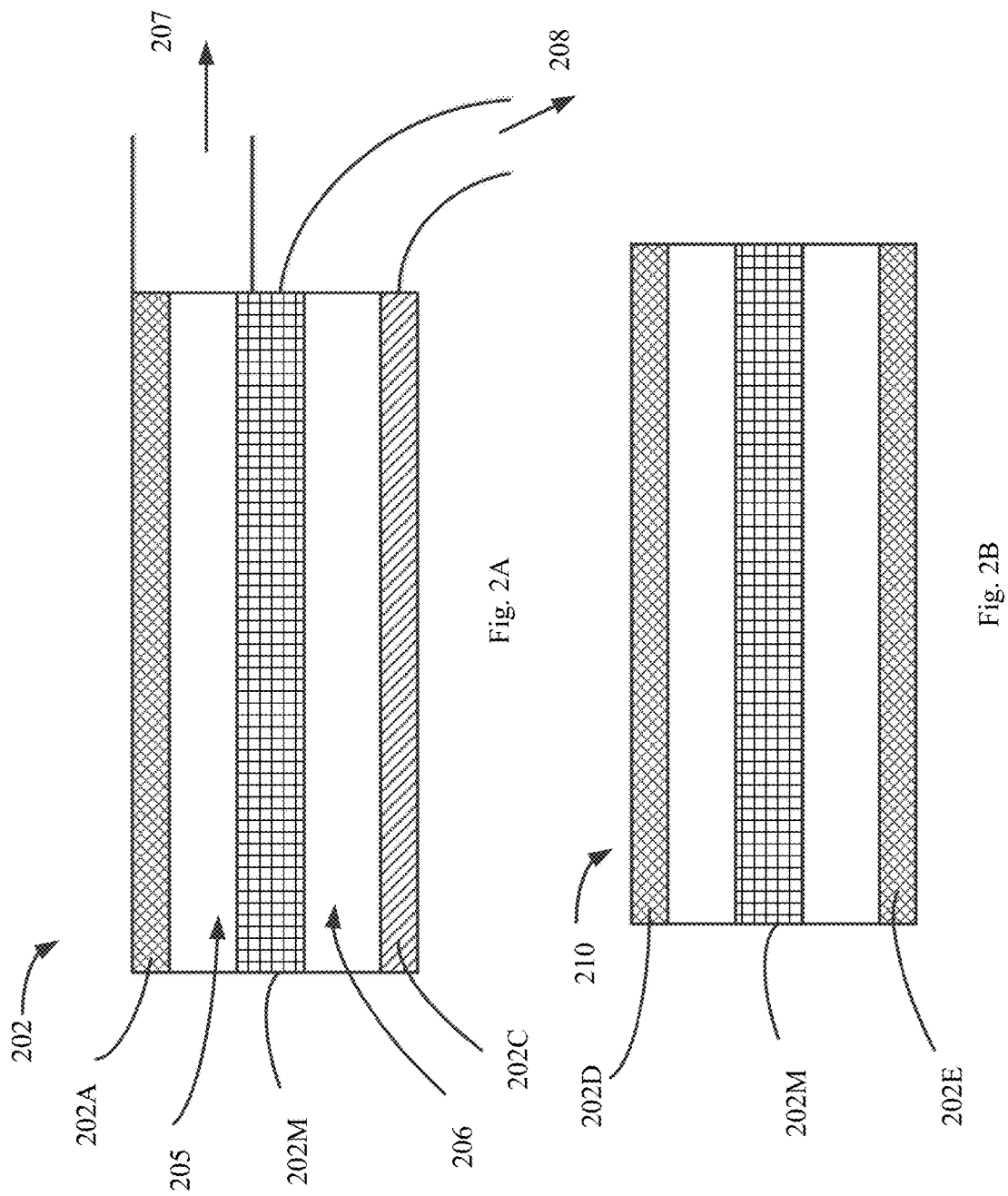

APPARATUS FOR PRODUCING AND DELIVERING OZONATED WATER

RELATED APPLICATION

This application claims priority to U.S. Provisional Patent Application No. 61/527,402, filed on Aug. 25, 2011 and titled "Apparatus for Producing and Delivering Ozonated Water," the entire disclosure of which is hereby incorporated herein by reference.

TECHNICAL FIELD

The present invention relates to ozone generation and use, and more particularly to ozone spray bottles.

BACKGROUND ART

It is known in the prior art to use electrolytic cells to produce various chemistries, such as compounds and elements. For example, electrolytic cells commonly produce ozone, an effective killer of pathogens and bacteria and, consequently, an effective disinfectant. The US Food and Drug Administration approved the use of ozone as a sanitizer for food contact surfaces and for direct application to food products. Accordingly, a wide variety of electrolytic cells in use today generate and dissolve ozone directly into source water, thus removing pathogens and bacteria from the water. This reduces the need for dissolving sanitizing chemicals, such as chlorine, directly into unclean water. Electrolytic cells also generate and dissolve ozone directly into source water to disinfect unsanitary surfaces.

SUMMARY OF THE EMBODIMENTS

In a first embodiment of the invention there is provided a system for dispensing ozonated water, the system including a tank having an interior for containing water; a nozzle for releasing ozonated water from the system; a current source having a current output; an electrolytic cell located between the nozzle and the tank, the electrolytic cell electrically coupled to the current output, and configured to ozonate water as the water flows from the tank to the nozzle; a cell monitoring circuit configured to monitor the voltage provided by the current source to the electrolytic cell when the electrolytic cell is ozonating water, and configured to determine the operational status of operation of the electrolytic cell based on that voltage; and a status indicator configured to indicate to a user the operational status of operation of the electrolytic cell.

In some embodiments, the cell monitoring circuit is further configured to determine the lifetime status of the electrolytic cell, and the status indicator is further configured to conditionally indicate to the user that the electrolytic cell is nearing the end of its useful life. In some embodiments, the status indicator includes a warning light, and the monitoring circuit is configured to illuminate the warning light when the monitoring circuit determines that the electrolytic cell is nearing the end of its useful life.

In some embodiments, the status indicator may be called an ozone production light, and the monitoring circuit is configured to illuminate the ozone production light when the monitoring circuit determines that electrolytic cell is operating to ozonate water.

In some embodiments, the status indicator includes an end-of-life light, and the monitoring circuit is configured to illuminate the end-of-life light when the monitoring circuit determines that the electrolytic cell has reached the end of its useful life.

In some embodiments, the monitoring circuit is configured to stop supplying current to the electrolytic cell and/or to stop supplying power to the pump when the monitoring circuit determines that the electrolytic cell has reached the end of its useful life.

In some embodiments, the system further includes a switching circuit configured to controllably reverse the polarity of the current supplied to the electrolytic cell from a first polarity to a second polarity, and the cell monitoring circuit is configured to monitor the voltage provided by the current source in each of the first polarity and second polarity configurations.

In another embodiment, an apparatus for selectively dispensing water in a plurality of modes includes a tank having an interior for containing water; a nozzle for directing water out of the apparatus; an electrolytic cell located between the nozzle and the tank, the electrolytic cell configured to ozonate water as the water flows from the tank to the nozzle; a dispensing sensor; a trigger; and selecting logic for setting the apparatus in either a dispensing mode or a trigger mode, such that the apparatus is configured to output ozonated water in response to actuation of the dispensing sensor when in the dispensing mode, and the apparatus is configured to output ozonated water in response to actuation of the trigger when in the trigger mode.

In some embodiments, the nozzle is configurable to deliver ozonated water in at least two different directions relative to the tank. In some embodiments, the dispensing sensor comprises at least one of a tactile sensor and a non-contact sensor.

In some embodiments, the trigger is inactive when in the dispensing mode. In some embodiments, the dispensing sensor is inactive when in the trigger mode.

In some embodiments, the selecting logic comprises a switch for switching between modes.

In yet another embodiment, a bottle for applying ozonated water to a surface includes a tank having an interior for containing water; a nozzle for directing ozonated water out of the spray bottle; an electrolytic cell located between the nozzle and the tank, the electrolytic cell configured to ozonate water as the water flows from the tank to the nozzle; a pump for directing water from the tank and through the cell and nozzle; and at least one electronic component configured to monitor the power draw of the pump, the at least one electronic component further configured to switch off power to the electrolytic cell if the power draw of the pump meets or exceeds a predefined threshold.

A method of operating an electrolytic cell in a system, the method includes providing a fixed current to a current input terminal of the electrolytic cell; monitoring the cell voltage at the current input terminal; comparing the cell voltage to a predetermined threshold to assess the health of the electrolytic cell; and activating a status indicator to communicate the health of the electrolytic cell.

In one embodiment, the predetermined threshold comprises a predetermined voltage that indicates that the electrolytic cell is approaching, but has not yet reached, the end of its useful life in the system. In some embodiments, the predetermined threshold comprises a predetermined voltage that indicates that the electrolytic cell has reached the end of its useful life in the system.

In some embodiments, the method further includes deactivating the cell the result of the comparison of the cell voltage exceeds a predetermined voltage that indicates that the electrolytic cell has reached the end of its useful life in the system.

In some embodiments, the system includes a pump configured to supply water to the electrolytic cell, and wherein the method further comprising deactivating the pump if the result of the comparison of the cell voltage exceeds a predetermined voltage that indicates that the electrolytic cell has reached the end of its useful life in the system.

BRIEF DESCRIPTION OF THE DRAWINGS

The foregoing features of embodiments will be more readily understood by reference to the following detailed description, taken with reference to the accompanying drawings, in which:

FIGS. 2A and 2B schematically illustrate an embodiments of electrolytic cells;

DETAILED DESCRIPTION OF SPECIFIC EMBODIMENTS

Various embodiments described below provide an ozone-spray bottle that can, among other things, monitor the operation and health of an electrolytic cell and alert the user if the electrolytic cell is not producing sufficient ozone, or if the cell is nearing the end of its useful life so that a replacement cell should be ordered or installed. Such features reduce the chance that a user incorrectly believes that the bottle is producing ozonated water when, in fact, the bottle is not producing sufficient ozone, or perhaps is not producing ozonated water at all.

Some embodiments provide a spray bottle with a variety of operating modes. For example, in some embodiments, the sprayer may be controlled to produce ozonated water, or non-ozonated water. In other embodiments, the sprayer may be controlled to produce spray in one direction, and then controlled to produce spray in a different direction. Some embodiments may include two or more of the various features described herein.

Overview of Spray Bottle

Figure 1A:
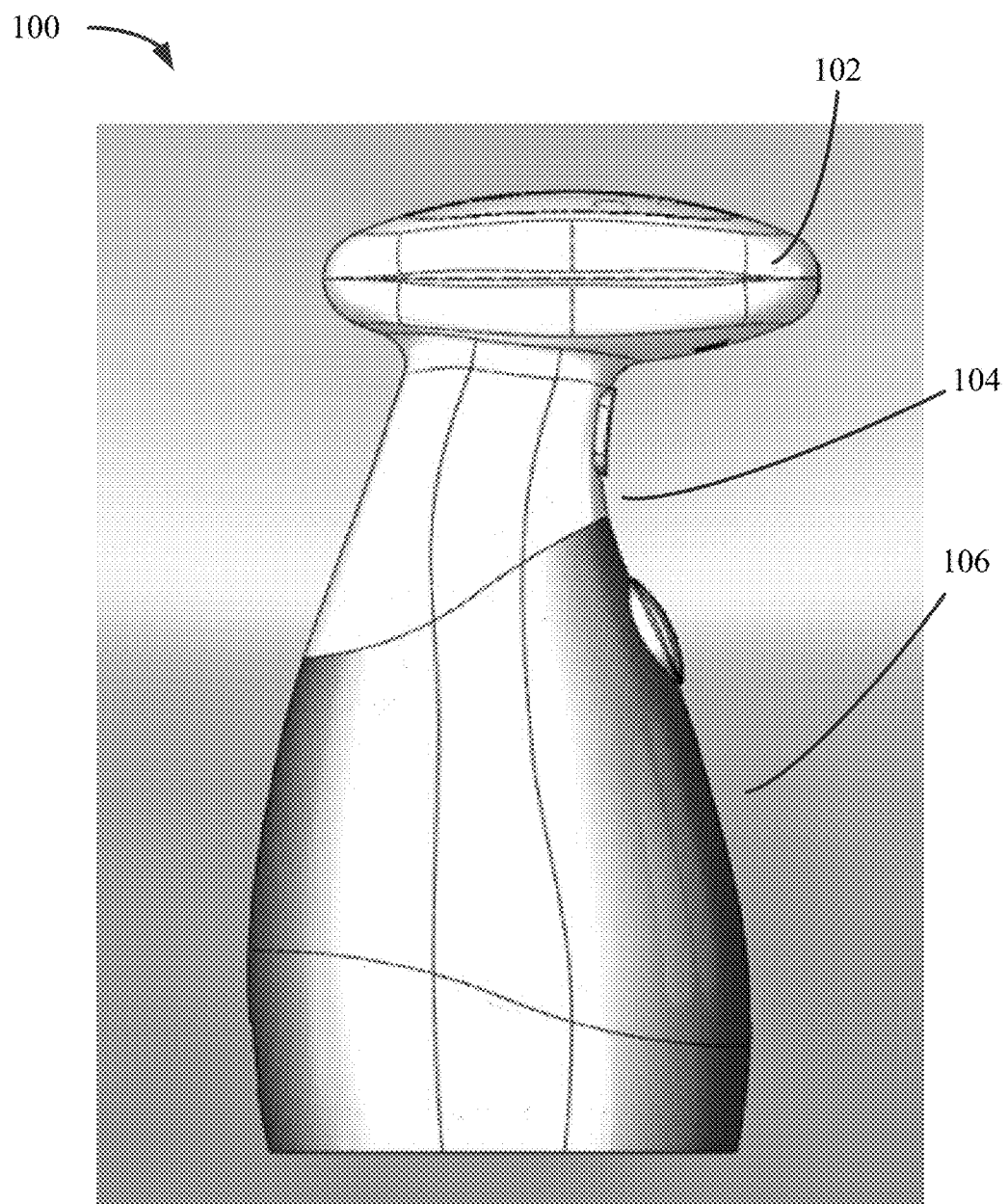
FIGS. 1A-1C schematically illustrated features of embodiments of an ozone spray bottle.
Figure 1B:
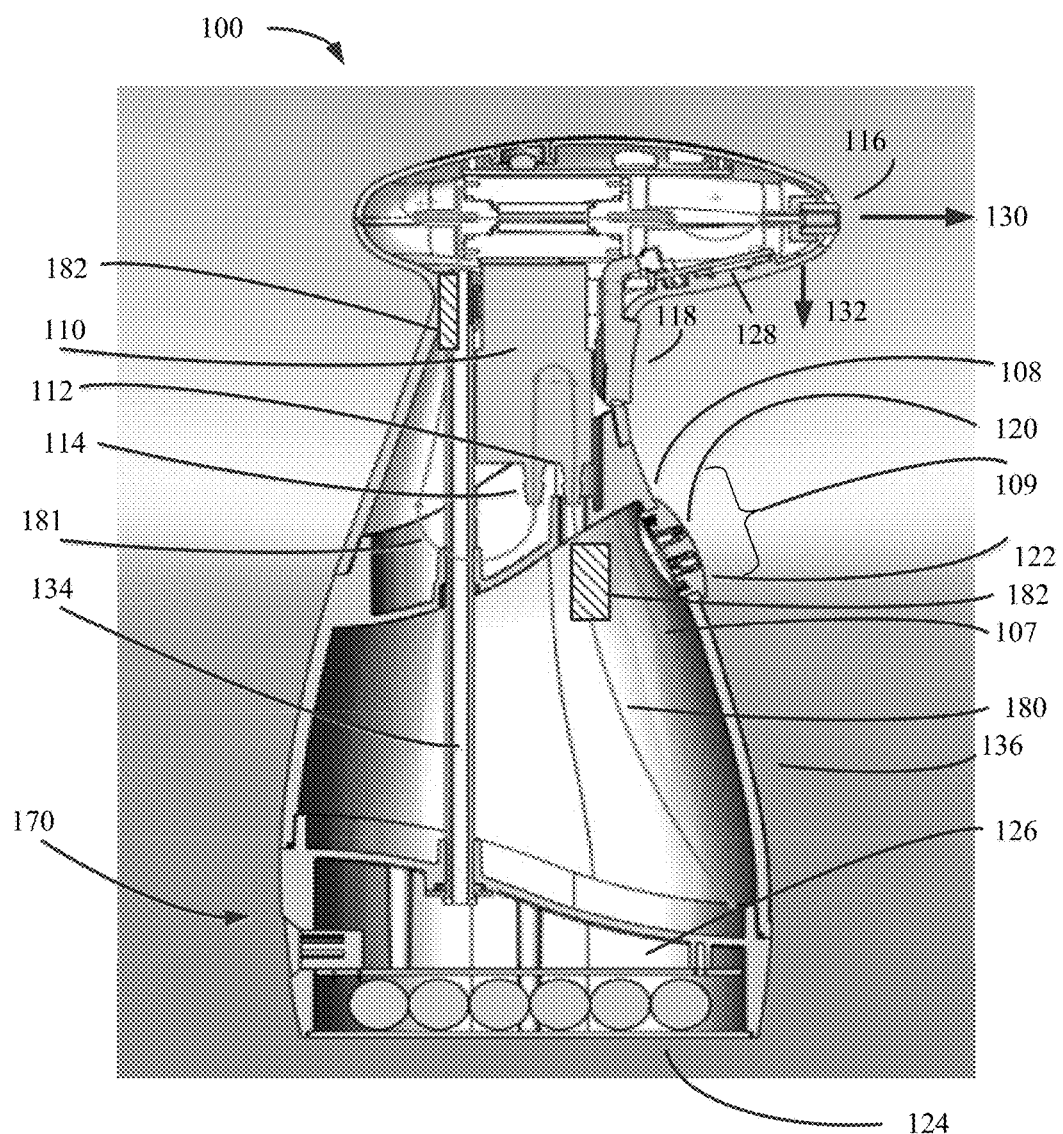

One embodiment of an ozone spray bottle 100 is schematically illustrated in FIG. 1A, an in cross-section in FIG. 1B.

Among other things, the spray bottle 100 includes a head portion 102 for delivering a stream of ozonated water in a prescribed manner, and a central portion 104 that is preferably shaped to facilitate gripping. As used in this description and any accompanying claims, the term "ozone spray" or "stream of ozonated water" means a fluid flow of water, which water contains ozone when it passes out of a bottle.

The central portion 104 may have a narrower profile with an easily graspable external surface, such as a two-shot injection molded rubber, to provide a more secure and easier grip for the user. The bottle 100 also has a base portion 106 for containing source water. Components within each of these portions 102, 104, and 106 are discussed in greater detail below.

A trigger 118 enables the user to eject ozonated water from the bottle 100. To that end, when the use activates the trigger 118, the pump 110 draws source water from the tank 107 and pumps the source water into the electrolytic cell 202. The trigger 118 also activates the electrolytic cell 202, causing circuitry to apply an electrical potential to the cell to ozonate the source water. The electrolytic cell 202 thus produces ozone that virtually immediately is dissolved within the source water. Any number of different cell designs can suffice for this application. The pump 110 produces a positive force that ejects the ozonated water through the nozzle 116 and out of the spray bottle 100.

Illustrative embodiments also include a circuit board 126 with a microcontroller, for controlling the functionality of the trigger. A sensor (e.g., a pressure transducer and/or a mechanical switch, as schematically illustrated 490 in FIG. 4) detects when the trigger 118 is actuated (e.g., a pressure transducer and/or a mechanical switch), and energizes the appropriate internal components. Specifically, sensor communicates with the electronics, which, in turn, communicate with the pump 110 and the electrolytic cell 202. When the user moves the trigger 118, thus activating the sensor, the electronics activate the pump 110 and the cell 202, generating and ejecting ozonated through the nozzle 116.

Base Portion 106

Base portion 106 includes a tank 107 for storing water, and supplying source water to the electrolytic cell 202. To receive the source water, the tank 107 has a water inlet 109 that mates with a threaded plug 108. When coupled with the water inlet 109, the threaded plug 108 provides a water-tight seal, preventing water from escaping from tank 107. The plug 108 may also include a knob or dial so that the user can more easily thread the plug into the water inlet 109.

A pump 110 (e.g., an electronic pump) within the central portion 104 drives the entire fluid path within the bottle 100. Specifically, the pump 110 draws the source water from the tank 107 and toward the electrolytic cell 202 through a hose 180 between the pump inlet 112 and the tank 107. A second hose 181 thus directs water from a pump outlet 114 to the electrolytic cell 202. Accordingly, using this simple fluid path, the pump 110 draws source water from the tank 107, into the electrolytic cell 202, and eventually, after it is ozonated, out of the bottle 100 through an outlet in the head portion 102 (i.e., a nozzle 116).

Impurities within the source water undesirably can build up within the electrolytic cell 202 and, consequently, decrease cell efficiency. Accordingly, the spray bottle 100 also may have an internal filter 182 that removes scale and other impurities from the source water. The filter preferably is positioned to filter source water before it enters the electrolytic cell 202. For example, the filter 182 may be located within the tank 107, consequently filtering the source water before it flows to the pump 110. Alternatively, the filter 182 can be located between the outlet of the pump 114 and the electrolytic cell 202.

The base portion 106 also includes an electronics chamber 170. The electronics chamber may house, among other things, a power source to provide power to the electrolytic cell 202 and other electronics of the bottle, as well as a circuit board 126 bearing portions of the circuitry described herein.

A variety of different power sources can energize the bottle 100. For example, a hard-wired AC converter can receive power from a conventional wall plug. In the embodiment shown in FIG. 1B, however, six 1.2 volt batteries 124 within a chamber 170 underneath the tank 107 provide the power for the spray bottle 100. Some embodiments simply use non-rechargeable batteries. Other embodiments, however, use rechargeable batteries that can be charged directly through a hard wire connection, such as a power cord. In other embodiments, inductive components recharge the rechargeable batteries 124. For example, the spray bottle 100 can be placed within charging base station having an inductive coil that charges the batteries 124.

Rod 134

As schematically illustrated in FIG. 1B, in some embodiments the head portion 102, central portion 104, and base portion 106 are coupled together using a rod 134. The rod 134 and the housing 136 provide structural integrity for the spray bottle 100. In some embodiments, the rod 134 includes a threaded feature (e.g., 134T) so that the rod is removably coupleable to the head portion 102, central portion 104, and/or base portion 106. In this manner, the rod 134 can be removed from the spray bottle assembly 100 and the components of the spray bottle 100 can be disassembled. The interior of the rod can serve as a conduit for wires or other components.

Cell 202

As noted above, the spray bottle 100 includes an electrolytic cell 202 for ozonating source water to be delivered through a nozzle 116 (discussed in detail below). Both the nozzle 116 and cell 202 may be within the head portion 102, although either one can be in other areas. For example, the cell 202 could be within the central portion 104 or base portion 106.

One embodiment of an electrolytic cell 202 is schematically illustrated in FIG. 2A. The electrolytic cell 202 may has two electrodes: an anode 202A and a cathode 202C.

To form ozone, energizing circuitry applies a positive electric potential to the anode and a negative electric potential to the cathode. As known by those in the art, the difference in electric potential between these two electrodes breaks up water molecules into hydrogen cations and oxygen. The oxygen forms into ozone, which dissolves into the source water. The negative potential applied to the cathode, however, draws the hydrogen cations from the anode side of the cell to the cathode side. Once on the cathode side of the cell, the cations may form hydrogen bubbles.

Among other configurations, the anode 202A and/or the cathode 202C may have planar configurations. The anode 202A and cathode 202C may be formed from a variety of materials. For example, the cathode 202C may be formed from titanium or another conductive material, although these materials do not form an exclusive list of materials from which the cathode 202C may be fabricated The anode 202A may be a diamond material. For example, in some embodiments the anode 202A may be formed from a boron doped diamond material. In some embodiments, the anode 202A includes a coated diamond material (e.g., a substrate that is coated with a diamond material), while in other embodiments, the anode comprises a free standing diamond material. In various embodiments of the present invention, the free standing diamond material has a thickness of between 0.2 mm to 1.0 mm.

In alternative embodiments, both electrodes of the electrolytic cell 202 include a boron doped diamond material, as schematically illustrated in cell 201 in FIG. 2B. For example, one or both electrodes (202D and 202E) may include a free standing diamond material or a coated diamond material. In such embodiments, the electrolytic cell 202 may cycle between a positive potential on a first electrode, and then a positive potential on a second electrode. Such a cycle need not be periodic.

When a positive potential is applied to the first diamond electrode, it acts as the anode and the second diamond electrode acts as the cathode. When the polarity is reversed and the positive potential is applied to the second diamond electrode, then the first diamond electrode acts as the cathode and the second diamond electrode acts as the anode. In this manner, the cell 202 continuously produces ozone while cycling through the differing polarities. Reversing the polarity across the electrolytic cell 202 may prevent build-up of scale on the membrane and other cell components.

In some embodiments, a membrane 202M is sandwiched between the anode and cathode, as schematically illustrated in both FIG. 2A and FIG. 2B. The membrane 202M is used as a solid electrolyte and placed between the two electrodes 202A and 202C (e.g., a proton exchange membrane (PEM), such as Nafion®) to facilitate movement of protons between the anode 202A and cathode 202C. To enhance its structural integrity, the membrane 202M may also include a supporting matrix.

Additionally, in some cases, the membrane 202M is used as a barrier to separate water flow on the cathode side of the cell 300 from water on the anode side of the cell. For example, in cell 202 in FIG. 2A, membrane 202M serves to define two separate water paths. Water entering the cell 202 is diverted either to the anode side 205, or to the cathode side 206 of the cell 202. Water on the anode side 205 is electrolyzed, and the oxygen atoms form ozone and dissolve into the water. The hydrogen atoms pass through the membrane 202M to the cathode side 206.

In some embodiments, the water flowing in the anode side 205 of the cell 202 exits the cell 202 and ultimately leaves the bottle 100 through nozzle 116, without being recombined with the water on the cathode side 206 of the cell 202.

In some embodiments, the water on the cathode side 206, along with the hydrogen released by the electrolysis, is returned to the tank 107 via a path 208 separate from the path 207 taken by the ozonated water. Such embodiments yield a spray or stream of ozonated water that has a higher concentration of ozone than would a spray or stream that was re-combined with water from the anode side of the cell 202.

Power to Cell

The cell 202 requires electrical power to electrolyze the water flowing through it. Prior art electrolytic cells have been powered by voltage sources. However, the inventors have discovered that the ozone-production capacity of an electrolytic cell may degrade over time, so that the drive voltage supplied to the cell yields progressively less ozone production at the cell ages.

This phenomenon may be due, for example, to the build-up of scale in the cell 202. Prior art drive circuits have addressed the problem of scale build-up by periodically reversing the polarity of the voltage applied to the cell. In one polarity, a first electrode in the cell acts as the anode and a second electrode acts as the cathode, but when the polarity of the drive voltage is reversed, the first electrode acts as the cathode while the second electrode acts as the anode. While such an approach extends the life of the cell, it does not prevent scale build-up entirely, and therefore the ozone-production capacity of an electrolytic cell driven by a voltage source inevitably decays with use.

In contrast, some embodiments drive the electrolytic cell 202 with a current source, which supplies a desired current to the anode 202A. As such, the current is controlled, and the voltage varies as required to maintain the desired current flow, and thus the desired ozone production.

Figure 3A:
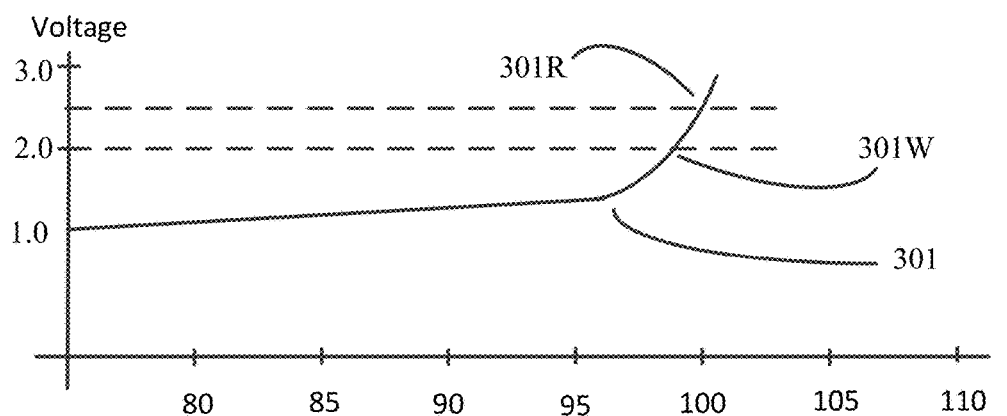
FIGS. 3A and 3B schematically illustrate certain operational characteristics of an electrolytic cell.
Figure 3B:
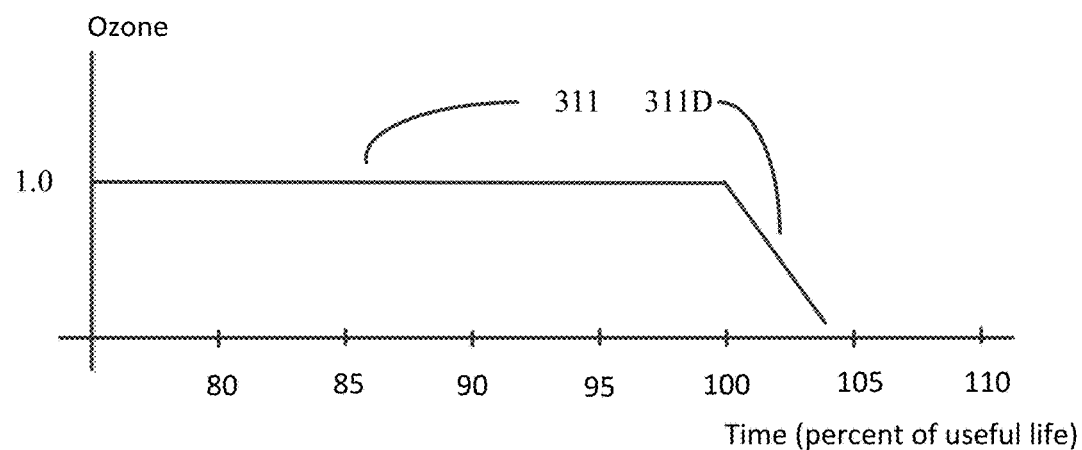

The operating characteristics of such a cell are schematically illustrated by FIGS. 3A and 3B. In a new electrolytic cell driven by a constant current source, the voltage supplied to the cell 220 by the current source remains substantially constant at a nominal value. The voltage axis in the graph of FIG. 3A expresses the voltage supplied by the current source as a ratio of that voltage to the nominal voltage. The time axes in FIG. 3A and FIG. 3B are expressed as percentages of the "useful life" of an electrolytic cell.

As shown in FIG. 3A, the voltage 301 required to maintain ozone production 311 rises as the electrolytic cell ages. However, given the constant current drive, the ozone production 311 remains substantially constant for most of the cell's lifetime, as shown in FIG. 3B.

The inventors have discovered that the rising drive voltage yields information about the operation of the electrolytic cell. Indeed, the rising drive voltage signals that the cell is nearing the end of its useful life. For purpose of this application, the end of the useful life" of an electrolytic cell is defined as the point at which the cell can no longer produce the desired amount of ozone given the defined drive current and a maximum drive voltage. A maximum drive voltage may be defined as the maximum voltage that the driving current source can provide, and represents a real limitation in real-world circuits. At the end of its useful life, the ozone production of the cell drops off 311D, as shown in FIG. 3B.

Thus, the inventors have discovered that the drive voltage may be monitored to assess the health of the electrolytic cell. For example, a drive voltage that is twice the nominal drive voltage (301W) may indicate that the cell has reached 97 percent of its useful life. At this point, the cell continues to produce the desired amount of ozone, but it may be prudent to alert the user that the cell is approaching its end of life.

Similarly, a drive voltage 301 that is 2.5 times the nominal drive voltage (301R) may indicate that the cell has reached the end of its useful life. At this point, the cell may be producing some ozone, but its production is less than the desired amount of ozone. As such, it may be prudent to alert the user that the cell has reached its end of life.

The examples illustrated by FIGS. 3A and 3B are merely illustrative. Actual voltages, voltage ratios and ozone production characteristics will depend on the particular cell being used, and the characteristics of the system in which the cell is being used, such as maximum available drive voltage, for example.

Figure 4:
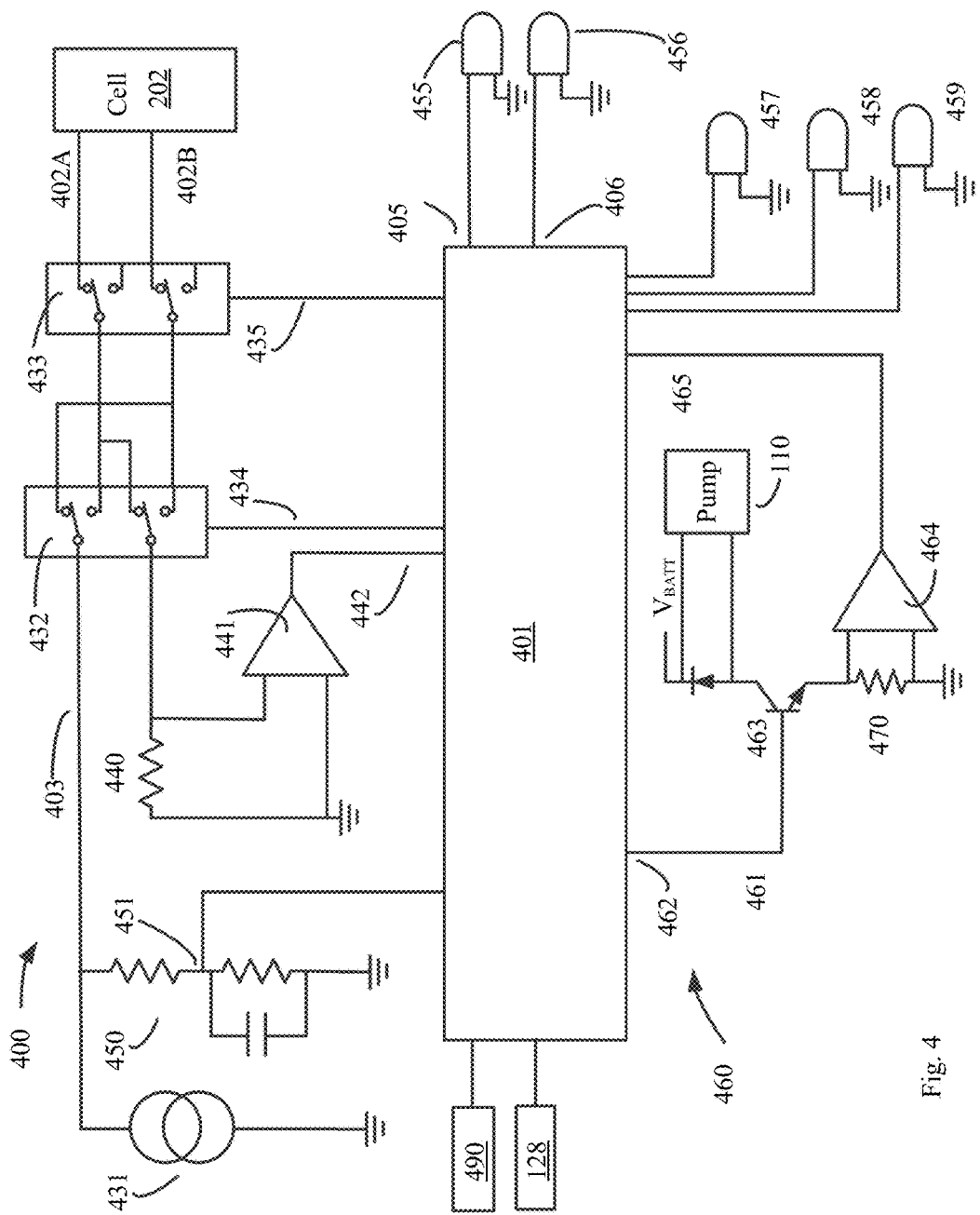
FIG. 4 schematically illustrates circuitry for operating various components of a spray bottle system.

An embodiment of a circuit for driving and monitoring an electrolytic cell is schematically illustrated in FIG. 4. The heart of this embodiment is a microcontroller 401, such as the PIC16F1829, available from Microchip Technology Inc., for example, although other microcontrollers or circuits could also be used. Microcontroller 401 has a programmable CPU, and includes, among other things, digital memory, comparators, an analog-to-digital (A/D) converter, communications interfaces (such as an I/C bus interface or RS232 interface, for example), and various input and output terminals.

In operation, a current source 431 outputs a fixed current to the electrolytic cell 202, through a set of relay circuits 432 and 433. The two relays in relay circuit 433 control the application of the current to the cell 202, under the control of microcontroller 401 via control line 435. In the configuration illustrated in FIG. 4, current from current source 431 is coupled to cell terminal 402B, while cell terminal 402A is coupled to ground. If the relays in relay circuit 433 were switched to their other positions, terminals 402A and 402B would not be connected to the current source or to ground. As such, relay circuit 433 acts to enable or disable electrolytic cell 202.

Relay circuit 432 controls the polarity of the application of the current to the cell 202, under the control of microcontroller 401 via control line 434. In the configuration illustrated in FIG. 4, current from current source 431 is coupled to cell terminal 402B, while cell terminal 402A is coupled to ground. If the relays in relay circuit 432 were switched to their other positions, the current from the current source would be coupled to cell terminal 402A, while cell terminal 402B would be coupled to ground. In this way, the polarity of the drive power to the cell 202 can be controllably reversed, for reasons described above.

The amplitude of the current is specified as that amount of current that will produce the desired amount of ozone in the electrolytic cell 202. As such, the desired amount of current is a function of specific electrolytic cell and the quantity of ozone production desired.

Because the current input to the cell 202 is fixed, the voltage at the input to the cell 202 is variable, depending on the impedance of the cell for example. The impedance of the cell may change over time due, for example, to scale build-up on the electrodes. In some embodiments, the current source 431 is a switching power supply that boosts the battery voltage to a voltage necessary to drive the cell 202 at the fixed current.

The cell voltage, and optionally the cell current, is monitored to assess the operation and/or health of the cell. In some embodiments, one or more of the electrical parameters of the power provided to or drawn by an electrolytic cell may be monitored (for example, using the circuits and methods described below in connection with voltage divider 450 and shunt resistor 440) to assess whether the cell is producing ozone (for example, whether the current and/or voltage to the cell are within the nominal ranges for example as illustrated in FIGS. 3A and 3B). If so, a monitoring circuit may indicate the operational status of the cell by activating a status indicator (such as light 459, for example). Alternately, a status indicator could be activated if the operation of the assessment indicates that the cell is not producing ozone.

In some embodiments, the voltage supplied to the cell 202 may be monitored through resistor divider 450, although other circuits could be used. The voltage at node 451 is a fraction of and is proportional to the voltage supplied to the cell 202, and can be used by microcontroller 401 to assess the operation of the cell, as described above. For example, the voltage at node 451 may be supplied to the A/D converter in microcontroller 401.

Figure 5:
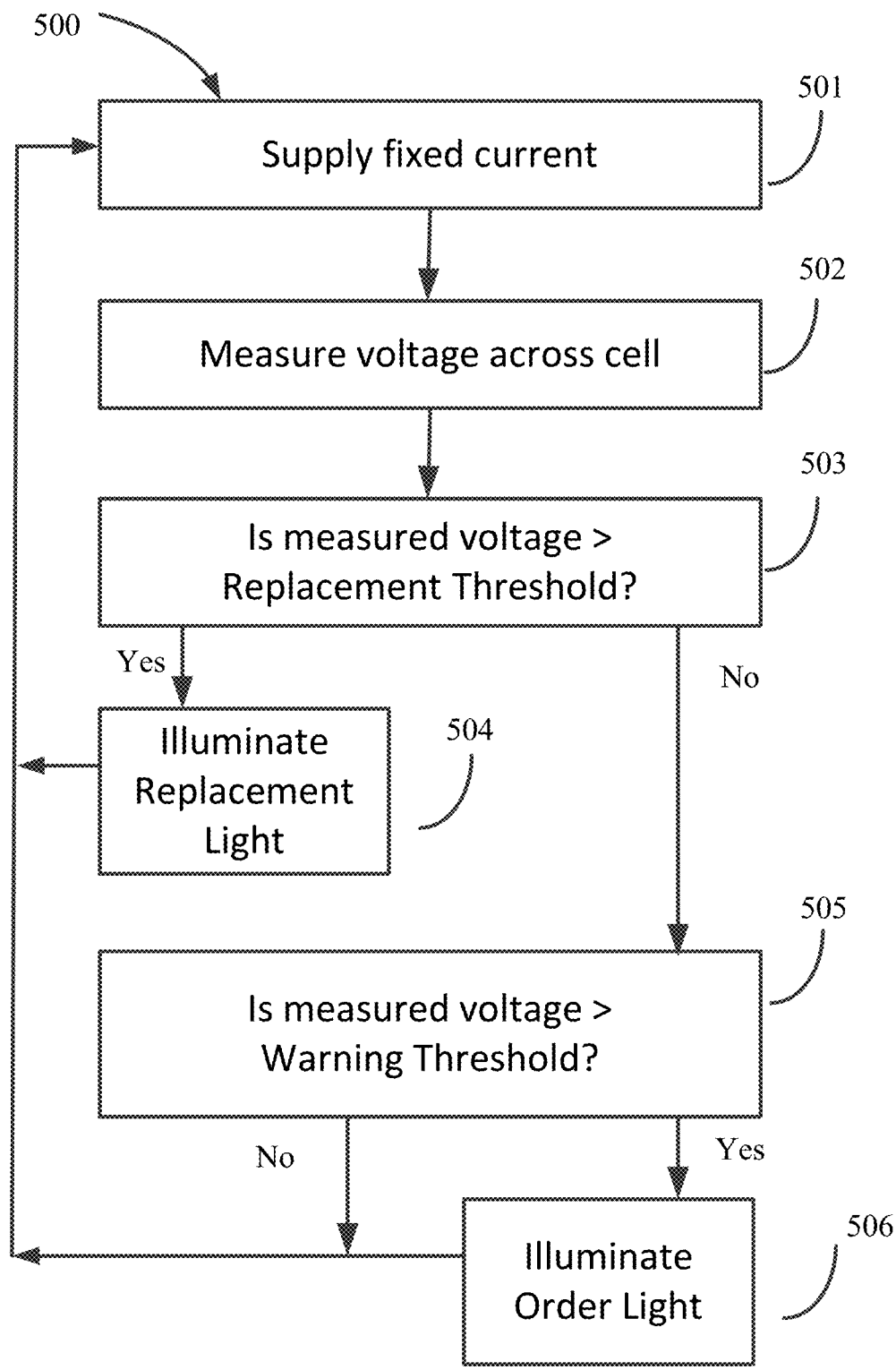
FIG. 5 illustrates a method of monitoring and operating an illustrative electrolytic cell.

In some embodiments, microcontroller 401 is programmed to assess the measured drive voltage as part of the process 500 illustrated in FIG. 5. The process 500 begins by supplying the fixed drive current to the electrolytic cell (step 501). For example, the programmed microcontroller 401, under control of software, may close the relays in relay circuits 432 and 433 so as to couple the current source 431 to the cell 202 as shown in FIG. 4.

The process 500 then measures the voltage across the cell (step 502), and compares the measured voltage to a first threshold voltage, which may be known as a "Replacement Threshold" (step 503). The Replacement Threshold is a voltage that indicates that the electrolytic cell should be replaced. For example, this may be the voltage at which the cell has reached the end of its useful life, but in any case should be a voltage not greater than the voltage at which the cell has reached the end of its useful life. If the measured voltage meets or exceeds the Replacement Threshold, the microcontroller 401 may activate a status indicator and/or deactivate the electrolytic cell 202 (for example, by depriving the cell of power by, e.g., interrupting or cutting-off the flow of current to an input terminal of the cell). For example, the microcontroller 401 may illuminate a "replacement" light 455 by outputting an appropriate voltage or current on output terminal 405 at step 504. Other forms of status indicator may include audible signals, which may be produced by a beeper or a buzzer, or a tactile signal such as may be produced by a vibrating element, to name but a few.

If the measured voltage is less than the Replacement Threshold, the process 500 compares the measured voltage to a "Warning Threshold" at step 505. The Warning Threshold is a voltage that indicates that the electrolytic cell is nearing the end of its useful life, and that the user should consider ordering a replacement cell. If the measured voltage meets or exceeds the Warning Threshold, the microcontroller 401 illuminates an "order" light 456 by outputting an appropriate voltage or current on output terminal 406 at step 506.

Although the drive current is fixed, some embodiments also monitor the drive current to catch possible malfunction of the cell 202, or other components of the drive circuitry. The current may be monitored by measuring the voltage across a shunt resistor 440; and buffering or amplifying through buffer 441 before digitizing the voltage the A/D converter in microcontroller 401, via signal line 442. The shunt resistor should have a small resistance, so as not to cause a large voltage drop between the cell 202 and ground. In some embodiments, the shunt resistor may have a resistance of 0.1 ohms, for example. In this embodiment, the current is measured at the ground terminal of the cell 202 (e.g., through the relay circuits 432 and 433), although other embodiments may have the shunt resistor 440 in the current supply line 403.

Pump Operation

The inventors have also discovered that, in some embodiments, the operation of the spray bottle 100 may be characterized by the electrical operation of the pump 110. For example, the pump 110 will draw a nominal current when it pumps water from the tank 107 to the electrolytic cell 202. However, the current drawn by the pump may increase substantially if the tank runs dry, such that the pump runs dry.

Running the pump in such conditions is undesirable because the pump 110 may be damaged, and possibly because the electrolytic cell 202 may be damaged if there is insufficient water flowing through the cell 202 when the cell is under power. Specifically, if the cell 202 operates without sufficient water, its temperature rises, causing potential damage to its interior. Specifically, a temperature rise within the cell could damage the membrane between the electrodes. For example, some PEM membranes have melting temperatures as low as 100 degrees C.

As such, some embodiments also include electronics that determine when the fluid circuit within the bottle 100 no longer has adequate water to maintain the cell 202 in an appropriate operating range. The inventors discovered that one embodiment of the pump 110 draws nearly three times its normal operating current when the tank 107 does not have enough water to adequately supply the cell 202. This may happen when the tank 107 is empty or when the water level is too low for the tube coupled with the pump input to draw up water. The inventors thus used this phenomenon to detect when water is not being drawn from the tank 107.

Figure 6:
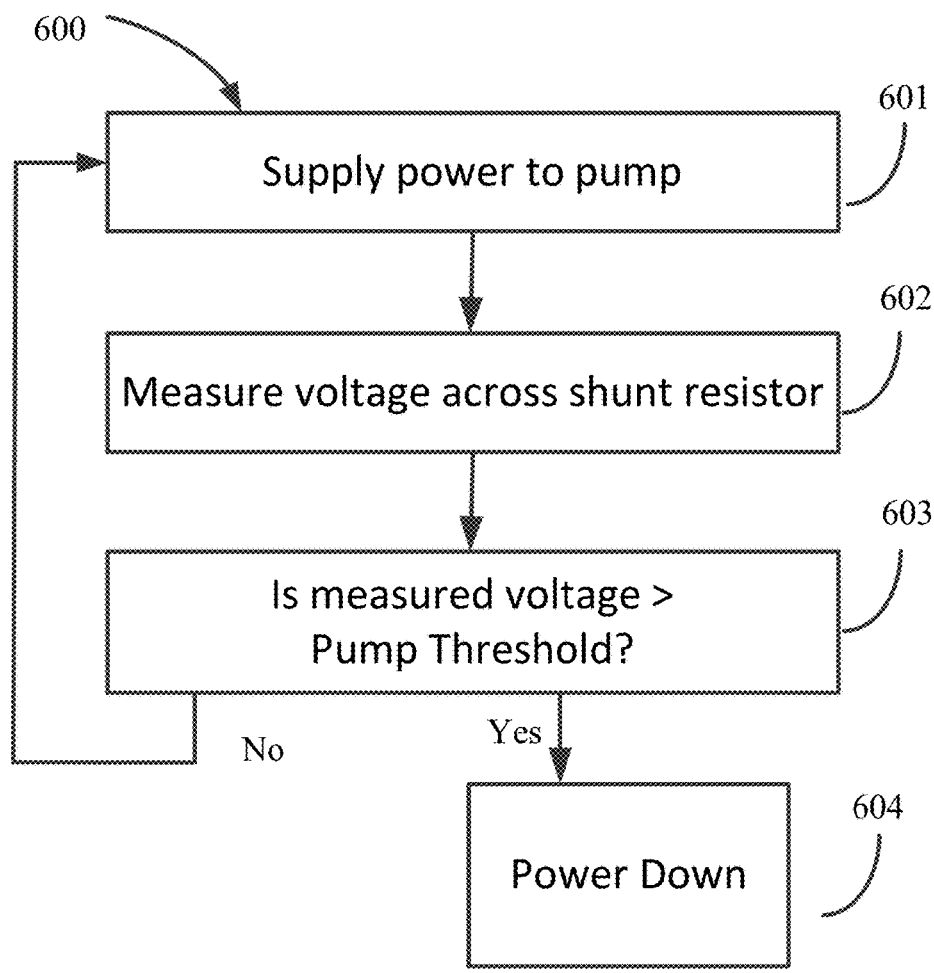
FIG. 6 illustrates a method of monitoring and operating a pump.
Figure 7:
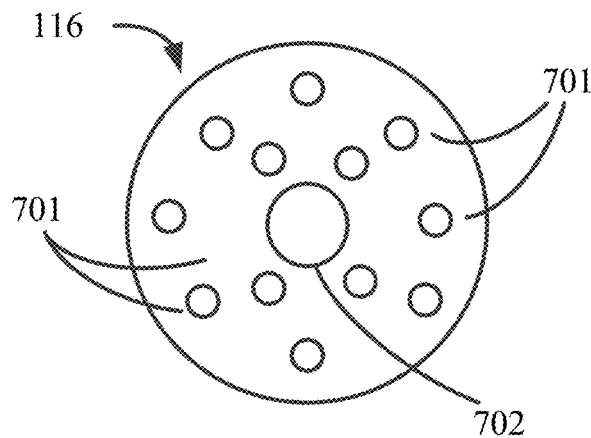
FIG. 7 schematically illustrates a spray nozzle output.

To that end, some embodiments include a circuit to power and monitor the operation of the pump. One embodiment of such a circuit 460 is schematically illustrated in FIG. 4, in which the pump 110 is controlled by the microcontroller 401 via signal line 461 from terminal 462. The operation of circuit 460 is described by the process illustrated in FIG. 6.

In this embodiment, the signal from microcontroller 401 activates transistor 463, which draws current from the batteries 124 through pump 110 (step 601).

Under normal operation, the circuit supplies power to the pump (step 601), and the pump should draw a nominal amount of current, or a current within a nominal range. That amount of current will depend, for example, on the operating characteristics of the particular pump, and the quantity of the desired water flow, as established by the system's designer.

The circuit 461 monitors the current through the pump by measuring the voltage (step 602) across a low-resistance shunt resistor 470 (e.g., 0.1 ohms for example); and buffering or amplifying through buffer 464 before digitizing the voltage the A/D converter in microcontroller 401, via signal line 465. The microcontroller then compares that voltage to "Pump Threshold" voltage that represents the nominal level (step 603).

If the measured pump current is at the nominal level, or within an expected range, then the pump may be deemed to be functioning normally, and it may be inferred that the tank 107 is still supplying water. As such the process begins again.

However, if the measured pump current is not at the nominal level or within the expected range, that may indicate a problem, including for example that the tank is not supplying sufficient water to the pump. In such cases, power to the pump, and/or power to the electrolytic cell 202, may be cut off (step 604), or the pump or cell may otherwise be deactivated. Optionally, the process at step 604 may also include causing the microcontroller to illuminate a warning light (458) to inform the operator the detected condition.

In some embodiments, if the pump and/or the electrolytic cell are both determined to be functioning properly, the microcontroller may enable a status indicator to alert the user (e.g., light 459).

Nozzle Outlets

In addition to driving fluid from the tank 107 and into the cell 202, the pump 110 also generates the pressure that ejects the ozonated water through the nozzle 116. Although the nozzle 116 may have many configurations, its delivery of ozonated water has a number of constraints due to environmental concerns with gaseous ozone. In one embodiment, the nozzle 116 includes at least one constricted diameter that increases the velocity of the ozonated water as it flows through the nozzle. In this manner, the nozzle 116 increases the application range of ozonated water.

The inventors discovered, however, that if the diameter of the nozzle 116 is too small, then the resulting stream of ozonated water also has a small diameter. Consequently, ozone undesirably escapes out of the water stream and into the atmosphere. To counteract this problem, in illustrative embodiments, the nozzle 116 includes a plurality of very small holes 701 (e.g., 0.25 mm in diameter). For example, the nozzle 116 may have multiple holes to create a "shower head" effect (e.g., the nozzle 116 includes six holes that are each 0.25 mm in diameter). Alternatively, some embodiments configure the nozzle 116 with a single hole 702 to create a single stream of ozonated water only. In yet another embodiment, the nozzle 116 is configured so that the user can select between various spray patterns (e.g., single hole 702 or multiple hole).

Check Valves

Figure 1C:
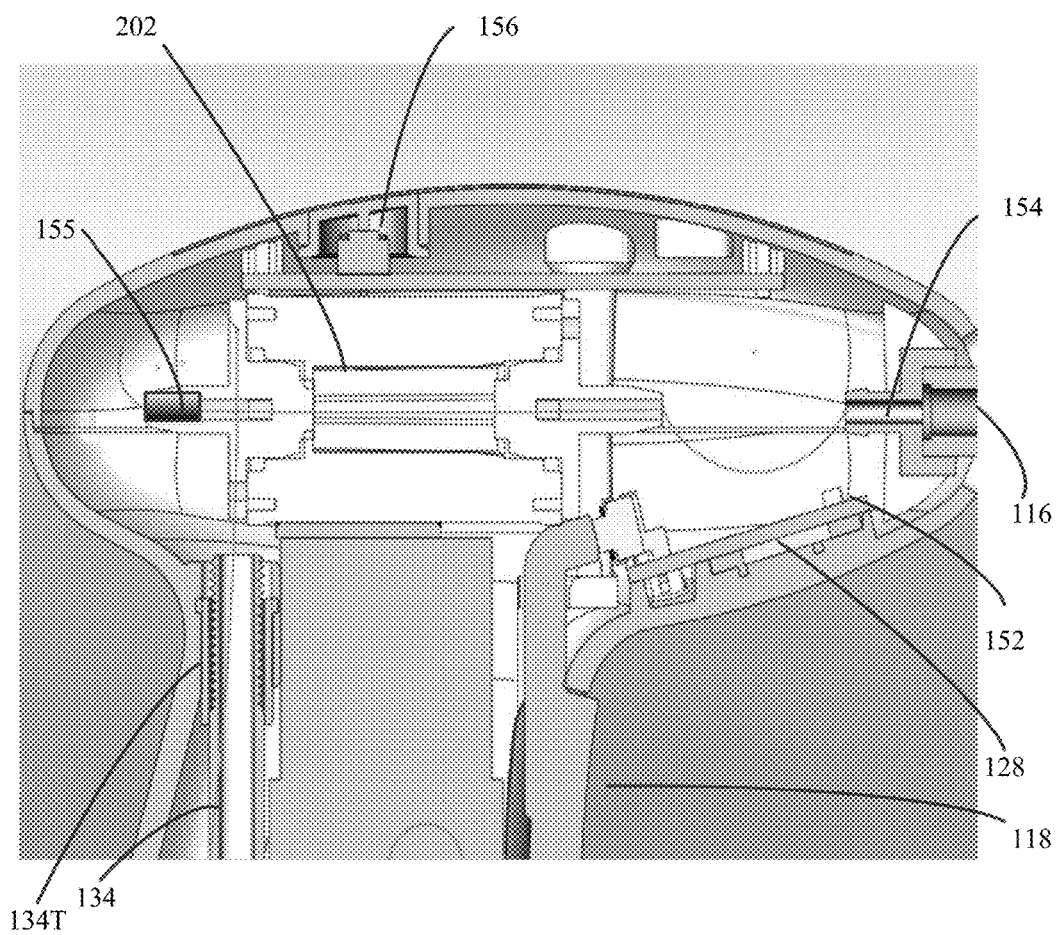

The inventors discovered that after prolonged non-use, water within an already primed or used spray bottle 100 often drains from the cell 202 and back toward the tank 107. In embodiments where there is a membrane, this undesirably dries out the membrane within the cell 202, which can lead to membrane damage and, ultimately, premature product failure. More specifically, cations may become trapped within the membrane if the cell 202 has been operated with impure water. These cations often remain trapped even when the membrane dries, hampering rewetting of the membrane and degrading performance. To mitigate that problem, the spray bottle 100 also may have a check 154 valve within the head portion 102. More specifically, as shown in FIG. 1C, the bottle 100 has a check valve for minimizing the likelihood that water will drain from the electrolytic cell 202 and into the tank 107 when the cell is not in operation. The check valve 154 preferably is located at a point between the nozzle 116 and the tank 107 (e.g., between the cell 202 and the nozzle 116) to retain water within the cell when the pump is not in operation. In some embodiments, a check valve 155 is located in the fluid path between the tank 107 and the electrolytic cell 202.

Check valves may also be located on the tank to permit selected gaseous exchange between the tank interior and the external environment. Specifically, as shown in FIG. 1B, when the pump 110 draws water from the tank 107, a check valve 120 may permit air to enter the tank 107 to equalize the pressure within its interior. Without this valve, a negative pressure may build up in the tank 107, causing stress on the pump and the entire system. Accordingly, the check valve 120 facilitates the flow of water out of the tank 107 and through the fluid paths within the bottle 100.

Some embodiments position another check valve 122 to exhaust gases that may build up within the tank 107. For example, the check valve 122 freely passes hydrogen bubbles from the interior of the tank to the external environment. As explained above, in certain embodiments, the water with the hydrogen byproduct from the cathode side of the cell 202 enters the tank 107. This hydrogen byproduct forms bubbles and corresponding gas, which passes through the check valve 122 and out of the tank 107. Pressure may increase within the tank 107 for a number of other reasons. For example, the tank pressure may increase if the water within the tank 107 vaporizes and/or the air within the tank expands because of a temperature increase. This check valve 122 thus releases any excess gas to the external environment, thus facilitating operation of the bottle 100. Illustrative embodiments position the check valves 120, 122 near the top of the tank so that hydrogen gas can rise and flow though the check valve. In the embodiment of FIG. 1B, the check valves 120, 122 are integrated into the threaded plug 208.

Multiple Operational Modes

Rather than operate exclusively as an ozone spray bottle, the bottle be selectively controlled to operate simply as a water bottle 100. Illustrative embodiments thus include functionality that enables the bottle 100 to function in any of a variety of modes. In one embodiment, the bottle 100 acts a spray bottle in one mode, and as an ozone spray dispenser (i.e., like a soap dispenser) in another mode. To that end, the bottle 100 has circuitry that sets the bottle 100 to either one of a "trigger" mode or a "dispensing" mode. In the trigger mode, the bottle 100 ejects ozonated water in response to actuation of the trigger 118—it acts as a spray bottle. In the dispensing mode, the bottle 100 ejects ozonated water in response to actuation of a dispensing sensor 128—it acts like a soap dispenser (even though it dispenses ozonated water). Among other places, the dispensing sensor 128 may be located on the underside of the head portion 102 of the bottle 100. In the embodiment shown in FIG. 1C, the dispensing sensor 128 is a non-contact sensor, such as an infra-red sensor, an electro-optical sensor, and/or a motion sensor. In other illustrative embodiments, however, the sensor 128 can be a tactile sensor, such a switch, a pressure sensor and/or a piezoelectric sensor.

Further, in some embodiments, the nozzle 116 may be configurable to selectively deliver ozonated water in at least two different directions relative to the tank 107. For example, in trigger mode, the nozzle 116 is configured so that water is ejected generally in a forward direction as shown by arrow 130 in FIG. 1B. In dispensing mode, however, the bottle 100 is configured to dispense water generally in a downward direction as shown by arrow 132 (or at an angle) by pivoting the nozzle 116. In either mode, the stream may be in the form of multiple streams (e.g., like a showerhead) in parallel or diverging paths.

In one illustrative embodiment, the nozzle 116 is configured to pivot and the user manually adjusts the direction of the nozzle. However, in other illustrative embodiments, the bottle 100 automatically pivots the nozzle 116 using, for example, an electric motor and/or an electronic actuator.

Accordingly, having the ability to select between dispensing mode and the trigger mode increase the functionality of the bottle 100. As noted above, when in the trigger mode, the bottle 100 acts much like a spray bottle and applies ozonated water to remote surfaces (e.g., counter tops, stove tops, sinks, and tables), while, in the dispensing mode, the bottle 100 acts similarly to a soap dispenser. In the dispensing mode, when the user places his hand on the underside of the head portion 102 of the bottle 100, the dispensing sensor 128 detects the presence of the user's hand, and ejects ozonated water downwardly onto the user's hand. In this manner, the user can disinfect his hand and/or apply ozonated water to cleaning utensils (e.g., sponges, rags, and/or paper towels).

In some embodiments, the bottle 100 also includes a mode switch 156 so that the user can switch between the dispensing mode and the trigger mode. In the embodiment shown in FIG. 1C, the switch 156 is located on the top of the head portion 102 of the bottle 100. In various illustrative embodiments, the bottle 100 includes visual indicia (such as LED lights, e.g., 457) for indicating the mode to which the bottle 100 is set.

Figure 8:
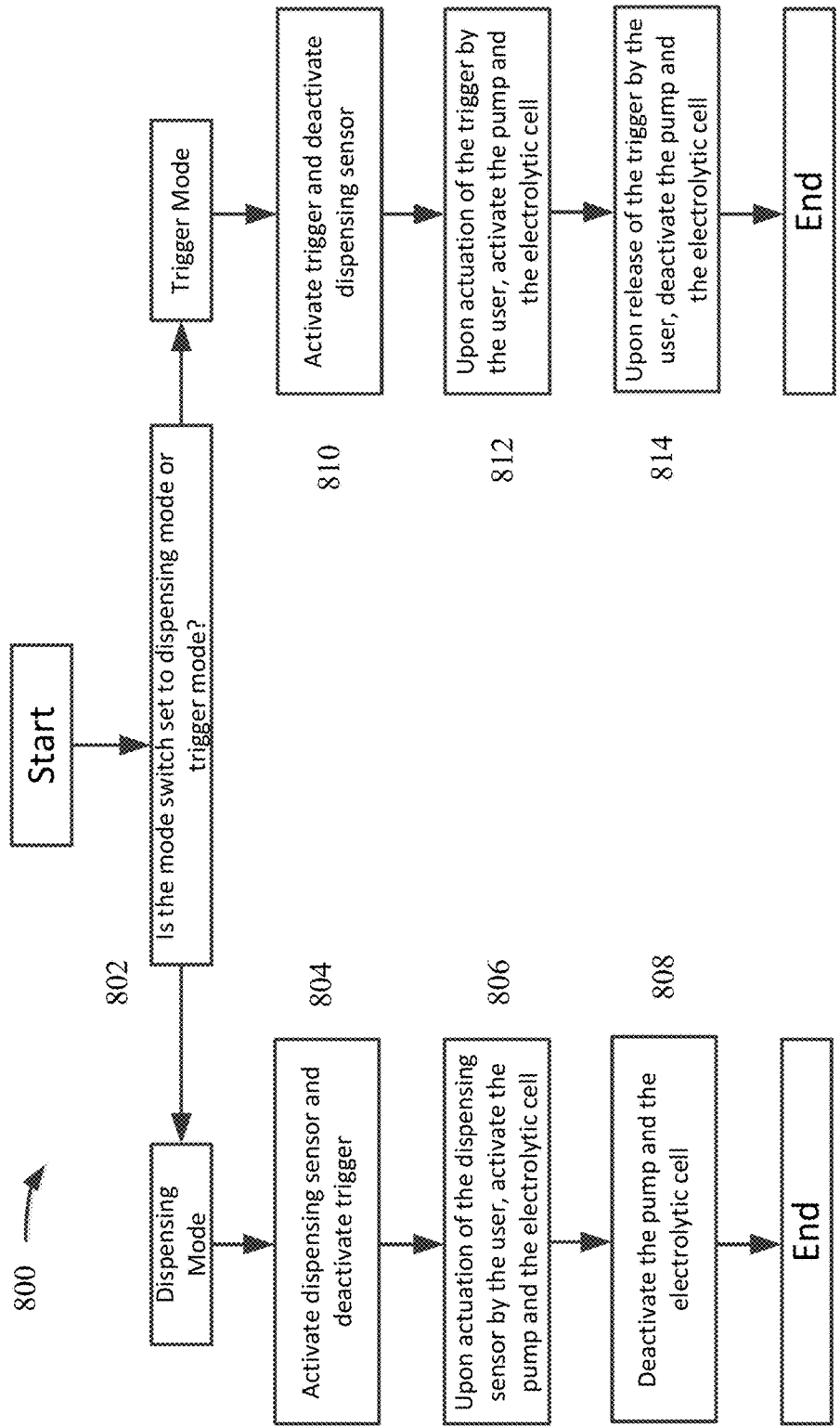
FIG. 8 illustrates a method of operating a spray bottle.

The bottle 100 thus includes electronics/circuitry (such as circuit board 152) for selecting between the dispensing mode and a trigger mode. FIG. 8 shows a process 800 for setting either the dispensing mode or the trigger mode in accordance with one embodiment of the present invention. Initially, the spray bottle circuitry determines whether the mode switch 156 is set to the dispensing mode or the trigger mode (step 802) by the user. In other words, the circuitry that is in communication with the mode switch 156 is responsive to selection of the mode switch by the user. If the user sets the switch 156 to the dispensing mode, then the circuitry activates the dispensing sensor 128 and deactivates the trigger 118 (step 804). Thus, in the dispensing mode, the circuitry awaits actuation of the dispensing sensor 128 to initiate ejection of the ozonated water, while the trigger 118 is inactive and cannot be used to initiate ejection of ozonated water. Upon actuation of the dispensing sensor 128 by the user, the electronics activate the pump 110, and the electrolytic cell 202 so that the bottle 100 can eject ozonated water in the prescribed direction (step 806). In some embodiments, after a predetermined time period and/or after a predetermined amount of ozonated water is ejected from the nozzle 116, the electronics deactivate the pump 110 and the electrolytic cell 202 (step 808). In other embodiments, however, the electronics deactivate the pump 110 and the electrolytic cell 202 only after the dispensing sensor 128 is no longer being actuated by the user.

If the switch 156 is set to the trigger mode, then the electronics activate the trigger 118 and deactivate the dispensing sensor 128, (step 810). Thus, in the trigger mode, the electronics await actuation of the trigger 118 to initiate ejection of the ozonated water, while the dispensing sensor 128 is inactive and cannot be used to initiate ejection of ozonated water. Upon actuation of the trigger 118 by the user, the electronics activate the pump 110 and the electrolytic cell 202 so that the bottle 100 can eject ozonated water (step 812). Once the user releases the trigger 118, the electronics deactivate the pump 110 and the electrolytic cell 202 (step 714).

In further illustrative embodiments, the electronics may also be configured to communicate with an electrical motor and/or electronic actuator for pivoting the nozzle 116. As explained above, in dispensing mode, the nozzle 116 is pivoted so that it ejects ozonated water in a downward direction.

Surfactants

In addition to producing ozonated water, some embodiments may add a surfactant to the water prior to ozonating the water, so as to produce water that includes both ozone and surfactant. The addition of a surfactant to the water may produce several benefits. For example, it some surfactants are known to increase the life of ozone in water. Also, while ozone has known disinfecting properties, the cleaning effect of the water may be increased by including a surfactant, such as sodium dodecyl sulfate ("SDS"), for example.

Definitions. As used in this description and the accompanying claims, the following terms shall have the meanings indicated, unless the context otherwise requires:

To "ozonate" water, or a fluid including water, is to decompose at least some of the molecules of water such that the oxygen atoms form ozone, which ozone remains in the water.

The "parameters" of electrical power provided to an electrolytic cell includes the voltage supplied to the cell and the current drawn by the cell. The voltage and current are each a "parameter."

The "operational status" of an electrolytic cell indicates whether (or not) the electrolytic cell is producing ozone.

The "lifetime status" of an electrolytic cell indicates whether the electrolytic cell is nearing, or has reached, the end of its useful life. For example, an electrolytic cell that draws a voltage in excess of a first pre-determined threshold may be deemed to be nearing the end of its useful life, and an electrolytic cell that draws a voltage equal to or in excess of a higher, second pre-determined voltage may be deemed to have reached or surpassed the end of its useful life.

The "useful life" of an electrolytic cell is the time during which the cell can produce ozone while drawing less than a pre-determined amount of power from a power source. In some embodiments, the voltage drawn by the electrolytic cell may be used as a proxy for the power drawn by the cell, and a pre-determined voltage may be used as a proxy for the pre-determined power drawn by the cell. The pre-determined power or voltage may be specified by the system designer based on factors such as maximum available power or voltage, or the available heat dissipation properties of the electrolytic cell or a device or system housing the cell, or the ozone-producing capacity of the electrolytic cell, to name but a few. As such, the term "useful life" may not be an absolute term. Rather, it may depend at least in part on the context or system in which an electrolytic cell is used, and/or how the electrolytic cell is used.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A bottle for applying ozonated water to a surface, the bottle comprising:

a tank having an interior for containing water;

a nozzle for directing ozonated water out of the spray bottle, wherein the nozzle comprises a plurality of apertures in fluid communication with an electrolytic cell, each aperture having a diameter of not less than 0.25 mm;

the electrolytic cell located between the nozzle and the tank, the electrolytic cell configured to ozonate water as the water flows from the tank to the nozzle.

P2. The bottle according to potential claim P1, wherein the apertures are arranged in a circular pattern about a central point.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In alternative embodiments, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

A process that is completely or partially implemented on a computer, microprocessor, or microcontroller (i.e., a "computer process") is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system for dispensing ozonated water, the system comprising:
    an electrolytic cell;
    a base portion comprising a tank having an interior for containing water, and a power source to provide power to the electrolytic cell;
    a head portion having a nozzle for releasing ozonated water from the system; and
    a rod coupling the base portion to the head portion and providing structural integrity to the system, wherein the rod contains wires electrically coupling the power source to the electrolytic cell;
    the electrolytic cell disposed in fluid communication with the nozzle and the tank and configured to ozonate water as the water flows from the tank to the nozzle.

2. The system for dispensing ozonated water according to claim 1, further comprising a pump for directing water from the tank to the electrolytic cell.

3. The system for dispensing ozonated water according to claim 1, wherein the rod is threaded so that the rod is removably coupleable to the base portion and the head portion.

4. The system for dispensing ozonated water according to claim 1, further comprising a trigger configured to activate the electrolytic cell.

5. The system for dispensing ozonated water according to claim 2, further comprising a pump monitoring circuit configured to monitor the power drawn by the pump.

6. The system of claim 5, wherein the pump monitoring circuit is further configured to withhold power from the pump if the power drawn by the pump exceeds a threshold.

7. The system of claim 5, wherein the pump monitoring circuit is further configured to withhold power from the electrolytic cell if the power drawn by the pump exceeds a threshold.

8. A spray bottle for dispensing ozonated water, the system comprising:
    a base portion comprising a tank having an interior for containing water;
    an exhaust valve in fluid communication with the tank interior to exhaust gas from the tank to the exterior of the tank;
    an inlet valve in fluid communication with the tank interior to allow gas to enter the tank from the exterior;
    a water inlet to allow water to enter the tank, and a plug to mate with the water inlet, at least one of the inlet valve and exhaust valve disposed in the plug;
    a head portion having a nozzle for releasing ozonated water from the bottle; and
    an electrolytic cell disposed in fluid communication with the nozzle and the tank and configured to ozonate water as the water flows from the tank to the nozzle.

9. The spray bottle of claim 8, wherein the plug is threaded with threads that mate with the water inlet.

10. The spray bottle of claim 8 further comprising a pump for directing water from the tank to the electrolytic cell, and a trigger configured to activate the electrolytic cell and the pump.

11. The spray bottle of claim 10 further comprising a pump monitoring circuit configured to withhold power from the pump and from the electrolytic cell if the power drawn by the pump exceeds a threshold.

12. The spray bottle of claim 8, further comprising a hydrogen return path from a cathode of the electrolytic cell to the tank, to prevent hydrogen from recombining with ozonated water downstream from the cell.

13. A spray bottle for dispensing ozonated water, the system comprising:
    a base portion comprising a tank having an interior for containing water;
    an exhaust valve in fluid communication with the tank interior to exhaust gas from the tank to the exterior of the tank;
    an inlet valve in fluid communication with the tank interior to allow gas to enter the tank from the exterior;
    a water inlet to allow water to enter the tank;
    a plug threaded with threads that mate with the water inlet;
    a head portion having a nozzle for releasing ozonated water from the bottle; and
    an electrolytic cell disposed in fluid communication with the nozzle and the tank and configured to ozonate water as the water flows from the tank to the nozzle.

14. The spray bottle of claim 13 further comprising a pump for directing water from the tank to the electrolytic cell, and a trigger configured to activate the electrolytic cell and the pump.

15. The spray bottle of claim 14 further comprising a pump monitoring circuit configured to withhold power from the pump and from the electrolytic cell if the power drawn by the pump exceeds a threshold.

16. The spray bottle of claim 13, further comprising a hydrogen return path from a cathode of the electrolytic cell to the tank, to prevent hydrogen from recombining with ozonated water downstream from the cell.

17. A spray bottle for dispensing ozonated water, the system comprising:
    a base portion comprising a tank having an interior for containing water;
    an exhaust valve in fluid communication with the tank interior to exhaust gas from the exterior of the tank;

an inlet valve in fluid communication with the tank interior to allow gas to enter the tank from the exterior;

a head portion having a nozzle for releasing ozonated water from the bottle;

an electrolytic cell disposed in fluid communication with the nozzle and the tank and configured to ozonate water as the water flows from the tank to the nozzle; and a hydrogen return path from a cathode of the electrolytic cell to the tank, to prevent hydrogen from recombining with ozonated water downstream from the cell.

18. The spray bottle of claim 17 further comprising a pump for directing water from the tank to the electrolytic cell, and a trigger configured to activate the electrolytic cell and the pump.

19. The spray bottle of claim 18 further comprising a pump monitoring circuit configured to withhold power from the pump and from the electrolytic cell if the power drawn by the pump exceeds a threshold.

20. The spray bottle of claim 17, further comprising a hydrogen return path from a cathode of the electrolytic cell to the tank, to prevent hydrogen from recombining with ozonated water downstream from the cell.

\* \* \* \* \*